United States Patent [19]

Takeshi

[11] 4,080,293
[45] Mar. 21, 1978

[54] DOUBLE ACTING FILTER PRESS

[76] Inventor: Hoya Takeshi, Bushidanchi 12-101 Oaza Bushi 997 8, Irumashi, Saitamaken, Japan

[21] Appl. No.: 766,792

[22] Filed: Feb. 8, 1977

[30] Foreign Application Priority Data

Aug. 9, 1976 Japan .................................. 51-106719

[51] Int. Cl.[2] ............................................. B01C 25/12
[52] U.S. Cl. .................................... 210/230; 210/350
[58] Field of Search ............... 210/224, 225, 230, 231, 210/350, 351

[56] References Cited

U.S. PATENT DOCUMENTS

| 270,807 | 1/1883 | Johnson | 210/351 X |
| 596,995 | 1/1898 | Gray | 210/230 |
| 3,276,594 | 10/1966 | Gwilliam | 210/350 |
| 3,360,130 | 12/1967 | Kaga | 210/230 |
| 3,390,772 | 7/1968 | Juhasz | 210/225 X |
| 3,737,041 | 6/1973 | Kitajima | 210/350 X |

Primary Examiner—John Adee
Attorney, Agent, or Firm—Browdy and Neimark

[57] ABSTRACT

The disclosure is concerned with a filter press for performing a liquid-solid separation or clarification of highly viscous material such as fowl droppings or sea-bottom muds and, more specifically, with a double acting filter press having a function of additional pressing or squeezing of the material which ensures, in combination with the pressing performed by the liquid pressure onto filter cloths, an increased efficiency and capacity of the filtration. Disclosed herein is a reasonably designed arrangement for performing the above mentioned double acting functions.

6 Claims, 4 Drawing Figures

DOUBLE ACTING FILTER PRESS

BACKGROUND OF THE INVENTION

Conventionally, a variety of filter presses have been proposed and actually used. For instance, FIG. 1 shows one of the popular filter presses of the single acting type consisting of a filter plate 1, a filter frame 2 and a filter cloth 3 adapted to be disposed between the filter plate 1 and the filter frame 2 to be clamped and compressed by them. A liquid to be treated is adapted to be supplied to the filter frame 2, and then to be passed through the filter cloth 3. The liquid is finally collected through communication ports from a recess 4 of the filter plate 1. A cake 5 of separated materials left on the filter frame 2 can be removed at the time of separation of the filter plate 1 and the filter frame 2 from each other.

Although this type of filter press provides an easy collection of the filtrated cake by separation of the filter plate 1 and the filter frame 2 from each other, the following problem is inevitably caused due to the single acting nature which relies solely on the pressure exerted on the liquid to be filtrated. Namely, as the filtrated cake caught by the filter frame 2 is accumulated as a result of a continuous operation of the filter press, a higher pressure on the liquid becomes necessary to make the liquid pass through the filter. This drastic increase of the pressure of the liquid disadvantageously causes a rapid wearing down of the piston for pressurizing the liquid and, consequently, necessitates a frequent renewing of the piston parts such as a lip of the piston.

Another disadvantage is that a repeated assembling and disassembling of the filter is necessary for performing a complete separation of the liquid and the solid, since the capacity of the filter press for housing the liquid is considerably small so as to deteriorate the performance of the filter press.

It is therefore an object of the invention, in view of the above mentioned problems inherent in the conventional filter presses, to provide a filter press which is free from these problems.

It is another object of the invention to provide a filter press capable of performing an efficient separation of the liquid and the solid material through a compression of the liquid in a radial direction of the filter cloth.

It is still another object of the invention to provide a large scale of liquid-solid separation through compression of a large volume.

It is still another object of the invention to provide a filter press which can be easily disassembled to provide a facilitated collection of the filtrated cake.

SUMMARY OF THE INVENTION

According to the present invention, there is provided a filter press comprising a filter body consisting of a plurality of filter plates with filter cloths interposed therebetween, and a pressurizing means disposed in the filter body. As the liquid to be treated is pressed into the filter body, a pressurized fluid is introduced into the pressurizing member to cause a compression on the liquid in the radial direction of the filter cloth which, along with an axial compression, provides a double action of compression in two stages to perform the filtration. The liquid may be pressed into the filter body again as required. Then, the pressurized fluid is substituted with a new one to repeat the filtration. Thus, the cake finally left in the filter body contains only a very small amount of liquid, so that the subsequent treatment is much simplified and facilitated.

These and other objects, as well as advantageous features of the invention will become more clear from the following description of a preferred embodiment taken in conjunction with the attached drawings in which:

DESCRIPTION OF PREFERRED EMBODIMENT

Figure 1:
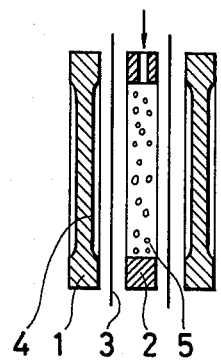
FIG. 1 is a schematic illustration of a part of a conventional filter press.
Figure 2:
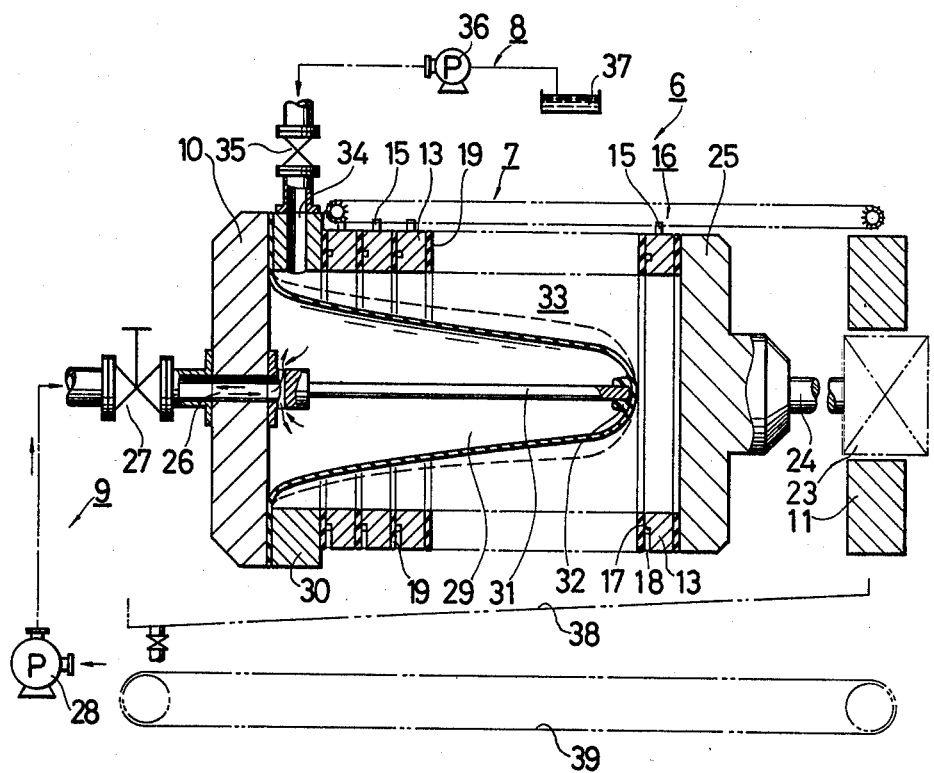
FIG. 2 is a sectional view of a whole structure of a filter press in accordance with the present invention.

Referring to FIG. 2 and subsequent Figures showing an embodiment of the present invention, a filter press in accordance with the invention for use in filtration of a highly viscous liquid such as fowl droppings or sea-bottom mud is generally denoted by a numeral 6.

Figure 3:
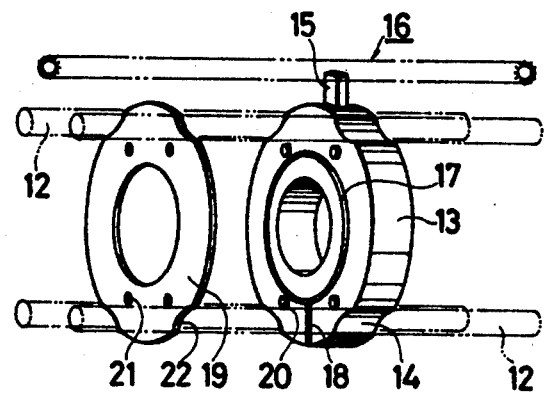
FIG. 3 is a perspective view of a filter frame, a filter cloth and a guide bar of the filter press in accordance with the present invention.
Figure 4:
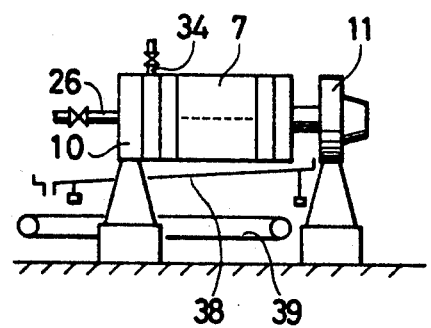
FIG. 4 is a schematic illustration of a whole structure of the filter press in accordance with the present invention.

The filter press 6 is constituted by a compression part 7, a liquid-introducing part 8 and a pressurizing medium feeding part 9. The compression part 7 includes four guide bars 12 extending between fixed ends 10, 11, as shown in FIG. 3. A plurality of ring-shaped filter frames 13 are slidably held by the guide bars. Each filter frame 13 has four guide grooves 14 at its each corner for slidingly engaging with one of the guide bars, and has at its uppermost portion a tab 15 for engagement with a known disassembler 16 incorporating a chain at the time of the disassembling.

An annular liquid-collecting groove 17 is formed in the side surface of each filter frame 13 suitably spaced from the inner periphery at the latter. The groove 17 is in communication with a dropping groove 18 formed at the bottom of each filter frame 13. A plurality of tabs 20 are formed on the side surface of the filter frame 13 for retaining an adjacent filter cloth 19. The filter cloth 19 has four notches 22 formed in its outer periphery for engagement with the guide bars 12 and is ring-shaped similarly with the filter frame 13. Bores 21 are formed axially passing through the filter cloth 19 for receiving the tabs 20 on the filter frame 13 for retaining the body of the filter cloth.

A plurality of filter frames and a plurality of filter cloths are alternatingly arranged on the guide bars abutting each other, and are adapted to be pressingly moved toward the left-hand side fixed end 10 by a movable end portion 25 through a connecting rod 24 adapted to be actuated by a hydraulic cylinder 23 provided at the right-hand side fixed end 11.

A fluid-inlet port 26 is formed in the left-hand side fixed end 10, and is connected to a fluid pressurizing pump 28 through a stop valve 27. The fluid may be a compressed air. A flexible inflatable member 29 which may be a bag made of a rubber or the like material is fixed at its periphery to the fixed end 10 by means of a clamp ring 30. The fluid-inlet port 26 is in communication with the interior of the inflatable member 29. The inflatable member 29 is supported at its free end by a supporting rod 31 to extend inwardly of a compression chamber 33 defined by the filter frames 13.

The compression chamber 33 is in communication with a liquid-feeding pump 36, through a stop valve 35 and a port 34 formed in the clamp ring 30. The liquid-feeding pump 36 is adapted to pressingly feed a liquid to be treated from a tank 37 into the compression chamber 33.

Beneath the compression part 7, is disposed a laterally displaceable conduit 38 for collecting the separated liquid, to lie under the dropping groove 18 formed at the bottom of the filter frame 13.

A conveyor belt 39 is disposed downwardly of the dropping groove 18 for collecting the filtrated cake in the manner known per se.

In operation, as the hydraulic cylinder 23 is energized, the filter frames are pressed to their positions. Then, the liquid-feeding pump 36 is started to feed the liquid to be treated into the compression chamber causing an external pressure on the inflatable member 29 to deflate the later. After the inflatable member 29 is deflated to a certain reduced size, a reactional force is resulted to cause a filtering pressure for a primary filtration. The stop valve 27 of the pressurizing part 9 is closed at this moment. The primary filtration pressure is accordingly transmitted to the hydraulic cylinder 23.

The stop valve 35 is closed after the liquid pressure is increased up to a predetermined level.

Subsequently, the stop valve 27 of the pressurizing means 9 is opened and the air pump 28 is started so that a compressed air may be introduced into the inflatable member 29. The inflation of the member 29 then causes a compression of the liquid in the compression chamber 33 to perform a secondary filtration.

Partly because this secondary filtration is made from the inside of the mass of the liquid and partly because the flexible inflatable member 29 well follows the reduction of the volume of the material under filtration, a highly efficient filtration is effected in a shorter period of time.

Subsequently, the stop valve 35 at the liquid inlet port 34 is opened. The pump 36 is then started to further introduce the liquid into the compression chamber 33. The valve 27 of the pressurizing means is kept opened during the introducing of the additional or new liquid, for allowing the deflation of the inflatable member 29 through discharging the air into atmosphere. Alternatively, a sucking may be used for hastening the deflation of the inflatable member.

After the deflation of the inflatable member 29, the liquid pressure again causes the primary filtration pressure onto the filter cloth 19. The stop valve 35 is again closed to enable the pressurizing means 9 to perform the secondary filtration in the manner described.

The primary and the secondary filtrations are thus repeated until the compression chamber 33 becomes full of the filtrated cake so as not to allow the further inflation of the inflatable member 29. The filtration is then completed for that time of operation.

During the filtration, the filtrated liquid is collected by the conduit 38, through the annular groove 17 and the dropping groove 18, for a subsequent treatment.

After the filtration is completed, the conduit 38 is laterally moved away from the filter press by suitable means, so that the lowermost conveyor belt 39 may confront the filter press.

A subsequent energization of the hydraulic cylinder 23 in a known manner causes a returning movement of the movable end 25 from the compression part 7 to the right-hand side fixed end 11. The disassembler 16 is then started to separate the filter frames 13.

Since the cakes in the compression chamber 33 are in the form of separate compact bodies, most of them naturally drop onto the conveyor belt 39 as the frames 13 are moved. Parts of cakes sticking to the filter frame 13 or to the inflatable member 29 can conveniently be removed by a hammering effected on the filter frame or evacuation of the inflatable member 29 to deflate the later.

The conveyor belt 39 thus collects the filtrated cakes and conveys them for the subsequent treatment or disposal.

Although air is used in the foregoing description for inflating the inflatable member 29, incompressible fluid such as oil may be used alternatively. The use of the incompressible fluid decreases the loss of compression of the filtered material attributable to the compression of the pressurizing medium itself.

It is remarkable that the filtration of highly viscous materials or sludges such as fowl-droppings or sea-bottom muds are efficiently performed at a large scale by the filter press of the present invention, thanks to the provision of a flexible and inflatable pressurizing member in the compression chamber defined by annular filter frames. The inflation of the inflatable member conveniently provides a secondary filtration which affords, in combination with the primary filtration provided by the pressure of the treated liquid itself, an enhanced filtration efficiency. In addition, since the secondary filtration is made by the inflatable member from the inner side of the mass of the filtered material, the application of the pressure to the filtering cloth is rendered highly uniform thereby to avoid undesirable local compression.

Since the filtration is mainly owed to the compression performed by the pressurizing member, the load on the liquid feeding pump can be much decreased as compared with conventional filter presses which rely solely upon the pressure of the liquid to be treated, requiring a reduced capacity of liquid feeding pump. In addition, the inflation of the pressurizing member conveniently compensates for the reduction of the volume of the material under compression to provide a large rate of compression which ensures a much enhanced filtration efficiency.

The repeated inflation and deflation of the pressurizing member, with addition of additional or new materials, advantageously provides a highly efficient filtration of a large scale.

The flexible nature of the pressurizing member provides an uniform separation of the liquid from the solid material, irrespective of omni-presence of the material, since it allows the pressurizing member to flexibly follow the shape of the omni-presence.

Since the filtrated cakes are made compact in the form of separate unitary bodies, they can naturally drop downwardly as the filter frames are separated from each other. Although a slight amount of cakes may be left on the filter frames sticking thereto, they can easily be dropped by a hammering applied to the filter frames. Parts of cakes sticking to the pressurizing member can be removed therefrom simply by evacuating and deflating the inflatable pressurizing member. Thus, according to the invention, the collection of the filtered cakes is also facilitated.

The loss of pressure attributable to the compression, i.e. the decrease of the volume, of the pressurizing medium itself can be avoided by the use of an incompressible fluid as the pressurizing medium for filling the pressurizing member.

What is claimed is:

1. A double acting filter press, comprising:
    a plurality of ring-shaped filter plates;
    a plurality of ring-shaped filter cloths, of shape substantially corresponding to that of said filter plates, disposed between adjacent filter plates, the assembled filter plates and filter cloths forming a tubular structure, the interior of which defines a compression chamber;
    enclosure means for enclosing the ends of said tubular structure;
    a substantially tubular flexible pressurizing member disposed axially within said tubular structure;
    liquid feeding means for feeding liquid into said compression chamber externally of said pressurizing member; and
    compression fluid supplying means for supplying compression fluid to the interior of said pressurizing member.

2. A filter press in accordance with claim 1, wherein each of said filter frames has a groove formed in each side surface for collecting filtrate passing through the adjacent cloth and a dropping groove in communication with each said groove and in communication with the exterior of the tubular structure.

3. A filter press in accordance with claim 1 wherein said pressurizing member has an open end fixed to said enclosure means at one end of the tubular structure, and a closed end, the filter press further including a support rod in the interior of said pressurizing member, connected at one end to said enclosure means at the end to which the open end of said pressurizing member is fixed, the other end of said support rod supporting the closed end of said flexible member.

4. A filter press in accordance with claim 1, further including compression means for releasably pressing together said filter plates and said filter cloths.

5. A filter press in accordance with claim 1, wherein said compression fluid supplying means includes an air pump for supplying compressed air into the interior of said pressurizing member.

6. A filter press in accordance with claim 1, wherein said compression fluid supplying means includes a liquid feeding pump fluidically connected to the interior of said pressurizing member.

* * * * *